United States Patent [19]

Bailey et al.

[11] 4,197,135

[45] Apr. 8, 1980

[54] WATERFAST INK FOR USE IN INK JET PRINTING

[75] Inventors: William D. Bailey; Bradley L. Beach, both of Lexington; Kenneth E. Edds, Versailles; Donald L. Elbert, Lexington, all of Ky.

[73] Assignee: International Business Machines Corporation, Armonk, N.Y.

[21] Appl. No.: 19,196

[22] Filed: Mar. 9, 1979

[51] Int. Cl.$^2$ ............................................. C09D 11/00
[52] U.S. Cl. ....................................... 106/23; 106/22; 106/308 N
[58] Field of Search ....................... 106/22, 23, 24, 25, 106/26, 308 N

[56] References Cited

U.S. PATENT DOCUMENTS 3,891,581  6/1975  Argenio ................................. 106/22

OTHER PUBLICATIONS

"Preparation & Dying of Synthetic Fibers", H. U. Schmidlin (1963), Chapman & Hall, Ltd., London pp. 200 and 201.

"The Chemical Technology of a Dyeing & Printing", Dr. Louis Diserens, vol. 11 (1951), Rheinhold Publ. Corp. N. Y. pp. 46, 48, 65, 66, 68, 71, 101, 103 and 108.

*Primary Examiner*—Morton Foelak
*Attorney, Agent, or Firm*—William J. Dick

[57] ABSTRACT

Disclosed is an ink for use in ink jet printers, the ink containing a water soluble dye, and a polyamine containing 7 or more nitrogen atoms per molecule, with the ink composition having a pH of 8 or above, the upper pH limit being dye decomposition dependent. The ink has improved water-fastness over an equivalent ink formulation without the polyamine additive.

7 Claims, No Drawings

WATERFAST INK FOR USE IN INK JET PRINTING

Summary of the Invention and State of the Art

The present invention relates to an ink for use in ink jet printers. The inks used in ink jet printers at the present time have need for improvement in waterfastness, i.e., the printing on a document should be resistant to wet rubbing as, for example, from a moist hand, and should remain legible even after the document has accidentally been exposed to water as, for example, from a flood or spilled water. The present invention provides a solution to this problem.

Polyethyleneimine has been found to improve waterfastness of inks to be used in ink jet printing. Polyethyleneimine, however, has been found not useful for inks designed for ink jet printer use because the direct and acid dyes used in ink jet printer ink contain an azo (—N=N—) linkage that is reduced in aqueous solution by the primary amine group on the polyethyleneimine molecule. This reaction occurs at room temperature upon extended shelf storage or more rapidly upon accelerated aging, for example at 60° C. In addition to loss of tinctorial value of the dye through such reduction, amine fragments from the dye are liberated and dye precipitation may also occur. All of these consequences are undesirable for ink jet printer operation. A typical writing ink containing a polyethyleneimine with a molecular weight of 500–100,000 is disclosed in French Pat. No. 1,480,068, Pacific Research Laboratory (Meisuer and Brown) but contains the primary amine group on the polyethyleneimine molecule.

The additives of the present invention, are to be distinguished from the polyethyleneimines of the prior art in that none of the amine functionalities are primary in order to avoid the aforementioned azo dye decomposition reaction. In general, the latter requirement may be met by synthesis of peralkyl or perhydroxyalkyl substituted polyethyleneimines, although other methods may also be envisaged by those skilled in the art.

In co-pending application Ser. No. 857,629 filed on Dec. 5, 1977 (SA9-77-033) is disclosed an ink for ink jet printers in which the ink includes a polyamine containing 6 or fewer nitrogen atoms per molecule with the ink composition having a pH of 8 or below. The ink disclosed therein is useful for ink systems in which the ink must be neutral or on the acid side of the pH range.

DETAILED DESCRIPTION OF THE INVENTION

The present invention discloses an ink with improved waterfastness for use in ink jet printing. The ink is an aqueous solution having a pH of 8 or above, preferably about 10, the upper pH limit being dye decomposition dependent and comprising at least one water soluble dye and from about ½ to about 5% by weight of a polyamine having 7 or more nitrogen atoms per molecule. It is required that none of the amine functionalities be primary. The preferred polyamines have the hydrogen of the primary amine group replaced with either a methyl or a hydroxyethyl group.

Other ingredients may also be present, for example, organic components which are well known in the prior art and which function as humectants, dye solubilizers, penetrants, sequestrants and biocides may be used, when desired, to modify the above formulation for improved ink jet function.

It has unexpectedly been found that the addition of various polyamines containing 7 or more nitrogen atoms per molecule, but without the primary amine group on the polyethylenemine molecule, to various ink formulations containing a water soluble dye has resulted in a substantial improvement in waterfastness when these inks are printed on paper. Specific example formulations for inks of the present invention are enumerated below.

| Materials | 1 | 2 | 3 | 4 | 5 | 6 |
|---|---|---|---|---|---|---|
| Food Black 2 | 4 | 0 | 0 | 0 | 0 | 0 |
| Direct Black 19 | 0 | 3.25 | 1.5 | 5 | 5 | 3.25 |
| Direct Black 38 | 0 | 0 | 0 | 0 | 0 | 0 |
| Direct Blue 1 | 0 | 0 | 0 | 0 | 0 | 0 |
| *MPEI (MW 300) | 0 | 0 | 0 | 0 | 0 | 0 |
| *MPEI (MW 60,000) | 2 | 1 | 1 | 1 | 1.6 | 0 |
| **HPEI | 0 | 0 | 0 | 0 | 0 | 1 |
| Distilled Water | 94 | 95.75 | 97.5 | 94 | 93.4 | 95.75 |

| Materials | 7 | 8 | 9 | [1]10 | 11 | 12 |
|---|---|---|---|---|---|---|
| Food Black 2 | 0 | 0 | 0 | 0 | 0 | 0 |
| Direct Black 19 | 1.5 | 5 | 5 | 3.25 | 3.25 | 3.25 |
| Direct Black 38 | 0 | 0 | 0 | 0 | 0 | 0 |
| Direct Blue 1 | 0 | 0 | 0 | 0 | 0 | 0 |
| *MPEI (MW 300) | 0 | 0 | 0 | 0 | 0 | 0 |
| *MPEI (MW 60,000) | 0 | 0 | 0 | 1 | 2 | 0 |
| **HPEI | 1 | 1 | 1.6 | 1 | 0 | 2 |
| Distilled Water | 97.5 | 94 | 93.4 | 94.75 | 94.75 | 94.75 |

| Materials | 13 | 14 | 15 | 16 | 17 | 18 |
|---|---|---|---|---|---|---|
| Food Black 2 | 0 | 0 | 0 | 0 | 0 | 0 |
| Direct Black 19 | 0 | 0 | 0 | .5 | 10.0 | 0 |
| Direct Black 38 | 4 | 4 | 0 | 0 | 0 | 0 |
| Direct Blue 1 | 0 | 0 | 4 | 0 | 0 | 0 |
| *MPEI (MW 300) | 2 | 0 | 0 | 0 | 0 | 0 |
| *MPEI (MW 60,000) | 0 | 2 | 2 | .5 | 5.0 | 2 |
| **HPEI | 0 | 0 | 0 | 0 | 0 | 0 |
| Distilled Water | 94 | 94 | 94 | 99 | 85 | 96 |
| Food Blue 1 (Acid Blue 74) | 0 | 0 | 0 | 0 | 0 | 2 |

Notes:
Adjusted to about pH 10 with sodium hydroxide and sodium carbonate.
*MPEI - N-Methylated polyethyleneimine
**HPEI - N-(2-Hydroxyethyl) Polyethyleneimine
[1] = (Preferred embodiment, example 10)

The expression "C.I. Direct", "C.I. Acid" and "Food Black" refers to the standard text called the Colour Index, in which Direct, Acid and Food Dyes are defined and exemplified. Direct, Acid and Food dyes are the preferred types of water soluble dyes for use in the present invention. In general, the concentration of the dye should be between about ½% by weight and about 10% by weight. Moreover, for best performance in ink jet printers and the like, the dye should be at least 90% pure.

An ink made in accordance with the present invention may be manufactured as follows:

Add the polyamine to distilled water while stirring. After the polyamine has dissolved, add sodium hydroxide until a pH of 10.5 to 11.0 is achieved, then slowly add the dye. Adjust the pH to a preferred range of between 10.0 to 10.4 with sodium carbonate and sodium hydroxide. Stir for four hours at room temperature and then filter the ink through a suitable membrane filter, dependent on the ink. The final filter may have pore size as small as 0.22 microns.

Specific examples of polyamine useful in the present invention include polymers made from ethyleneimine or substituted ethyleneimine monomers.

Direct, acid and food dyes are well known to the prior art. They may be used with the present invention to obtain whatever color ink is desired. Particularly suitable dyes include C.I. Food Black 2, C.I. Direct Black 19, C.I. Direct Black 38, C.I. Direct Blue 1 and C.I. Acid Blue 74.

As is well known in the art, the use of a penetrant increases the waterfastness effect for most inks. Particularly suitable are butyl carbitol and butyl cellusolve.

The aforegoing examples are given solely for purposes of illustration and are not to be considered limitations on the invention, many variations of which are possible without departing from the spirit or scope thereof.

What is claimed is:

1. An ink composition comprising an aqueous solution of at least one water soluble dye in about ½% to about 10% by weight concentration and a polyamine having 7 or more nitrogen atoms per molecule where the polyamine contains no primary nitrogens, in about ½% to about 5% by weight concentration, with the composition having a pH of 8 or above.

2. A composition as claimed in claim 1 where the water soluble dye is chosen from the group consisting of Direct Dyes, Acid Dyes and Food Dyes.

3. A composition as claimed in claim 1 having a pH of about 10.

4. A composition as claimed in claim 1 in which the polyamine is a perhydroxyalkyl substituted polyethyleneimines.

5. A composition as claimed in claim 4 in which the polyamine is 2-hydroxyethyl polyethyleneimine.

6. A composition as claimed in claim 1 in which the polyamine is a peralkylated substituted polyethyleneimines.

7. A composition as claimed in claim 6 in which the polyamine is permethylated.

* * * * *